(12) United States Patent
Tewari et al.

(10) Patent No.: US 8,347,612 B2
(45) Date of Patent: Jan. 8, 2013

(54) METHOD AND APPARATUS FOR REGENERATING A PARTICULATE FILTER SYSTEM

(75) Inventors: Asim Tewari, Bangalore (IN); Garima Bhatia, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 382 days.

(21) Appl. No.: 12/727,368

(22) Filed: Mar. 19, 2010

(65) Prior Publication Data
US 2011/0225949 A1   Sep. 22, 2011

(51) Int. Cl.
*F01N 3/00* (2006.01)

(52) U.S. Cl. ............ 60/295; 60/274; 701/103; 701/115; 701/117; 701/410; 701/415

(58) Field of Classification Search ...................... 60/295
See application file for complete search history.

(56) References Cited

U.S. PATENT DOCUMENTS

| | | | |
|---|---|---|---|
| 2002/0078684 A1* | 6/2002 | Carberry et al. | 60/295 |
| 2003/0091481 A1* | 5/2003 | Dang et al. | 422/180 |
| 2003/0230078 A1* | 12/2003 | Yahata et al. | 60/295 |
| 2004/0074682 A1* | 4/2004 | Fussey et al. | 180/65.2 |
| 2006/0000201 A1* | 1/2006 | Iizuka et al. | 60/286 |
| 2007/0271906 A1* | 11/2007 | Berke et al. | 60/285 |
| 2008/0078166 A1* | 4/2008 | Rose et al. | 60/284 |
| 2008/0173011 A1* | 7/2008 | Ruth et al. | 60/295 |
| 2009/0044530 A1* | 2/2009 | Gallagher et al. | 60/605.1 |
| 2009/0064665 A1* | 3/2009 | Iizuka et al. | 60/286 |
| 2009/0082938 A1* | 3/2009 | Onodera et al. | 701/103 |
| 2009/0113874 A1* | 5/2009 | McKee | 60/272 |
| 2009/0235644 A1* | 9/2009 | Wu et al. | 60/285 |
| 2009/0312889 A1* | 12/2009 | Krupadanam et al. | 701/1 |
| 2010/0043404 A1* | 2/2010 | Hebbale et al. | 60/286 |

* cited by examiner

*Primary Examiner* — Thomas Denion
*Assistant Examiner* — Jason Shanske

(57) ABSTRACT

A method for regenerating a particulate filter configured to treat engine exhaust gas in a vehicle equipped with an on-board navigation and an extra-vehicle communications system includes monitoring present operation of the vehicle, projecting vehicle operating conditions based upon information from the on-board navigation and the extra-vehicle communications system, monitoring a storage capacity of the particulate filter, executing a control scheme to regenerate the particulate filter when the storage capacity of the particulate filter exceeds an upper threshold, executing the control scheme to regenerate the particulate filter when the storage capacity of the particulate filter is less than the upper threshold and in response to an operator request to regenerate the particulate filter, and executing the engine control scheme to regenerate the particulate filter when the storage capacity of the particulate filter is less than the upper threshold and the projected vehicle operating conditions indicate an opportunity to regenerate the particulate filter.

7 Claims, 3 Drawing Sheets

METHOD AND APPARATUS FOR REGENERATING A PARTICULATE FILTER SYSTEM

TECHNICAL FIELD

This disclosure relates to regenerating a particulate filter of an exhaust aftertreatment system.

BACKGROUND

The statements in this section merely provide background information related to the present disclosure and may not constitute prior art.

An aftertreatment system for managing and treating an exhaust gas feedstream can include a particulate filter device that removes particulate matter including elemental carbon particles from the feedstream. Known applications for a particulate filter device include internal combustion engines operating lean of stoichiometry, including, e.g., compression-ignition (diesel) engines and lean-burn spark-ignition engines. Known particulate filter devices that accumulate particulate matter require periodic regeneration to oxidize the filtered particulate matter from the particulate filter device. Regeneration can require operations that increase temperature of the particulate filter device to a temperature range between 550° C. and 650° C. for a sufficient period of time to completely oxidize the filtered particulate matter. Increasing temperature of the particulate filter device can include increasing temperature of the exhaust gas feedstream, including, e.g., operating the internal combustion engine at a rich air/fuel ratio under specific speed/load operating conditions, and injecting hydrocarbons into the exhaust gas feedstream upstream of an oxidation catalyst that is upstream of the particulate filter device, among other operations. Such operations can have associated fuel penalties. It is also known that high temperature operation of particulate filter devices can reduce service life thereof.

Known particulate filter regeneration systems include monitoring one or more parameters of an exhaust gas feedstream and a particulate filter and triggering a regeneration event when a state of one of the parameters exceeds a threshold. By way of example, a pressure drop can be measured across a particulate filter and a regeneration event can be triggered when the pressure drop is greater than a predetermined threshold. Known particulate filter regeneration systems can be triggered to operate at engine and ambient conditions that are outside preferred conditions for a regeneration event. Operation of known particulate filter regeneration systems can result in incomplete regeneration, such as when a vehicle operator keys off a vehicle during a regeneration event and when vehicle acceleration is commanded during a regeneration event.

Known vehicles include global positioning sensors (GPS) and on-board navigation software for travel route planning and management. Known systems include monitoring traffic and ambient conditions, including vehicle speeds, amount of congestion, temperature, precipitation, and other factors.

SUMMARY

A method for regenerating a particulate filter configured to treat engine exhaust gas in a vehicle equipped with an on-board navigation and an extra-vehicle communications system includes monitoring present operation of the vehicle, projecting vehicle operating conditions based upon information from the on-board navigation and the extra-vehicle communications system, monitoring a storage capacity of the particulate filter, executing a control scheme to regenerate the particulate filter when the storage capacity of the particulate filter exceeds an upper threshold, executing the control scheme to regenerate the particulate filter when the storage capacity of the particulate filter is less than the upper threshold and in response to an operator request to regenerate the particulate filter, and executing the engine control scheme to regenerate the particulate filter when the storage capacity of the particulate filter is less than the upper threshold and the projected vehicle operating conditions indicate an opportunity to regenerate the particulate filter.

BRIEF DESCRIPTION OF THE DRAWINGS

One or more embodiments will now be described, by way of example, with reference to the accompanying drawings, in which.

DETAILED DESCRIPTION

Figure 1:
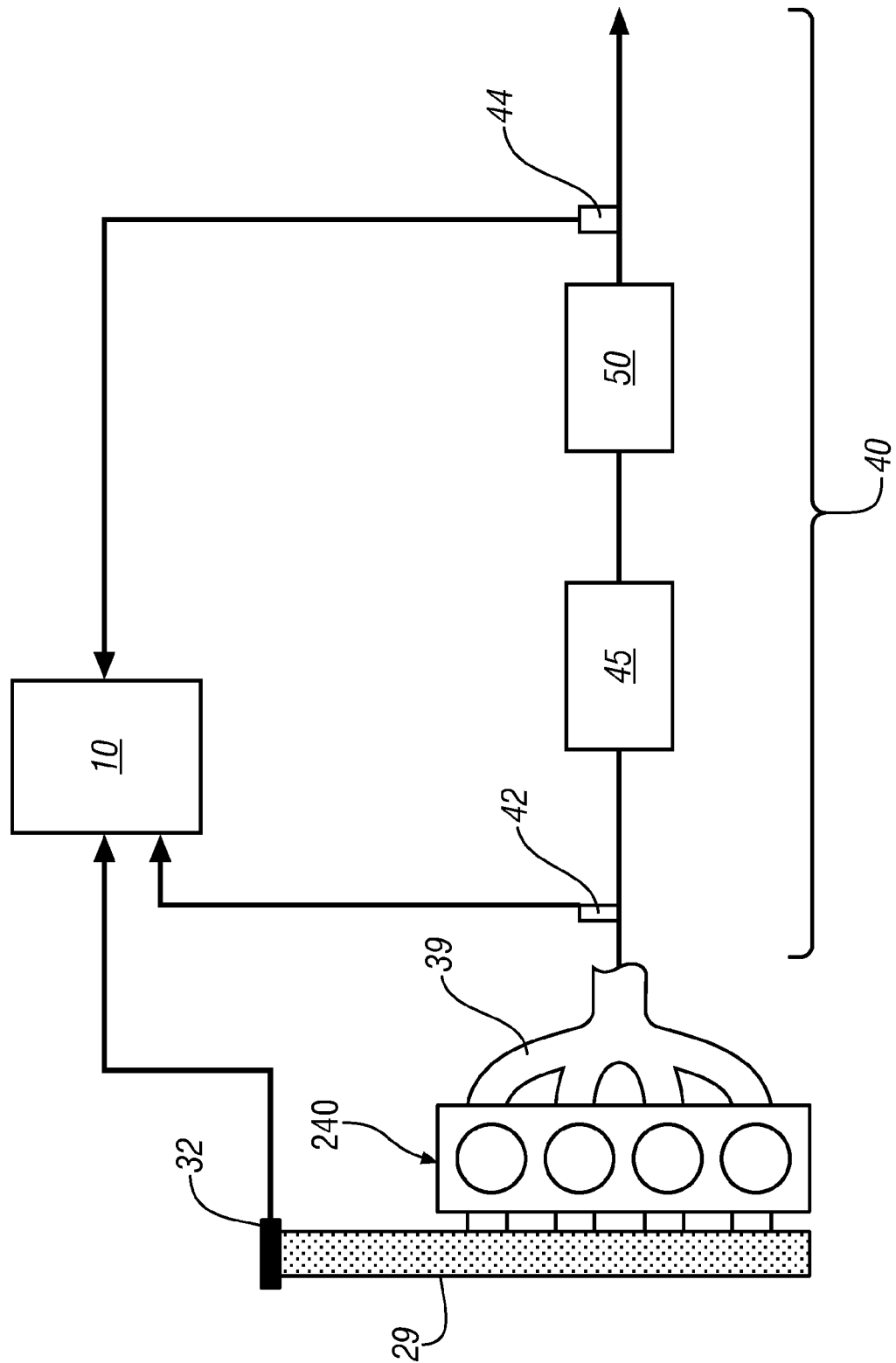
FIG. 1 is a two-dimensional schematic diagram of an internal combustion engine and an exhaust aftertreatment system in accordance with the present disclosure.

Referring now to the drawings, wherein the showings are for the purpose of illustrating certain exemplary embodiments only and not for the purpose of limiting the same, FIG. 1 schematically illustrates an exhaust aftertreatment system 40 and an accompanying control system executed in a control module 10 that has been constructed in accordance with an embodiment of the disclosure. The exhaust aftertreatment system 40 is depicted as being fluidly coupled to an exhaust entrainment system including an exhaust manifold 39 in one embodiment, although the methods described herein are not so limited. Like numerals refer to like elements in the figures.

In one embodiment, the engine 240 includes a multi-cylinder direct-injection four-stroke internal combustion engine that operates at a lean air/fuel ratio to generate mechanical power. An air intake system channels intake air to an intake manifold 29 which directs and distributes intake air into intake passages to combustion chambers of the engine 240. The air intake system includes air flow ductwork and devices for monitoring and controlling the engine intake air flow. The devices preferably include a mass air flow sensor 32 for monitoring mass air flow through the engine 240 and intake air temperature. Other engine control devices, e.g., a throttle valve can control air flow to the engine 240. The engine 240 includes the exhaust manifold 39 that entrains exhaust gases from the engine 240 and channels the exhaust gas feedstream to the exhaust aftertreatment system 40.

The exhaust aftertreatment system 40 includes at least one particulate filter 50 including a filter substrate element configured to remove particulate matter from the exhaust gas feedstream. In one embodiment, shown in FIG. 1, there is a first aftertreatment device 45 upstream of the particulate filter 50. In one embodiment, the first aftertreatment device 45 includes an oxidation catalyst coupled to a NOx reduction device. The exhaust aftertreatment system 40 preferably includes a first sensor 42 configured to monitor an exhaust gas feedstream out of the engine 240, which can include one of an air/fuel ratio sensor, an exhaust gas constituent sensor, and a pressure sensor. The exhaust aftertreatment system 40 preferably includes a second sensor 44 configured to monitor the exhaust gas feedstream downstream of the particulate filter 50, which can include an exhaust gas constituent sensor in one embodiment. Signal outputs of the first and second sensors 42 and 44 are monitored by the control module 10 for feedback control monitoring and diagnostics, including determining a storage capacity of the particulate filter 50 for filtering and storing particulate matter in the exhaust gas feedstream. The first aftertreatment device 45 and the particulate filter 50 can be assembled into structures that are fluidly connected and assembled in an engine compartment and a vehicle underbody.

The control system is executed as a set of control algorithms in the control module 10. Control module, module, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event. The control module 10 executes the control algorithms to monitor the particulate filter 50. The control system can control operation of the engine 240 in one embodiment, including controlling operation at a preferred air-fuel ratio to achieve performance parameters related to operator requests, fuel consumption, emissions, and driveability, with the intake air flow controlled to achieve the preferred air-fuel ratio. Engine control can include an engine control scheme to periodically control operation the engine 240 to regenerate the filter substrate of the particulate filter 50.

Figure 2:
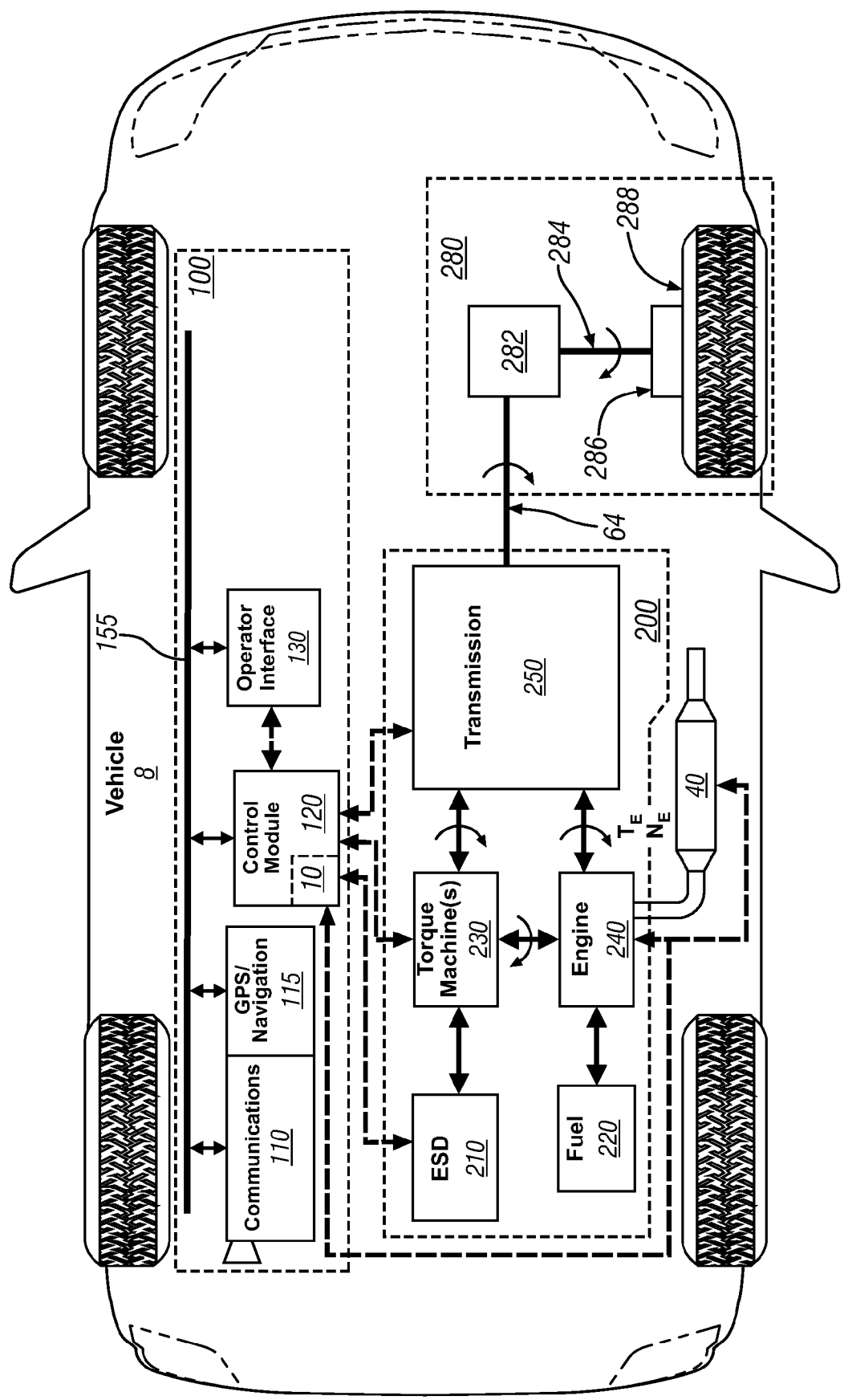
FIG. 2 is a two-dimensional schematic diagram of a vehicle system in accordance with the present disclosure.

FIG. 2 schematically illustrates an embodiment of a vehicle 8 equipped with a powertrain system 200 including an embodiment of the exhaust aftertreatment system 40 described with reference to FIG. 1. The vehicle 8 includes a control system 100 and a driveline 280. Like numerals refer to like elements in the description. In one embodiment, the driveline 280 includes a differential gear device 282 that mechanically couples to an axle 284 or half-shaft that mechanically couples to a wheel 288. A brake device 286 is included with the wheel 288. The differential gear device 282 is coupled to an output member 64 of the powertrain system 200. The driveline 280 transfers tractive power between a transmission 250 and the road surface. The powertrain system 200 includes a hybrid powertrain system in one embodiment, including an energy storage device (ESD) 210 that stores potential energy and is coupled to one or more torque machine(s) 230 to transfer power therebetween. The torque machine(s) 230 convert potential energy stored in the ESD 210 to mechanical power and convert mechanical power to energy that can be stored in the ESD 210. The engine 240 converts fuel stored in a fuel tank 220 to mechanical power. Mechanical power from the engine 240 can be transferred to the transmission 250 and the torque machine(s) 230. Mechanical power from the torque machine(s) 230 can be transferred to the transmission 250 and the engine 240. The transmission 250 transfers mechanical power between the engine 240, the torque machine(s) 230, and the driveline 280 via the output member 64.

The control system 100 includes a control module 120 that signally connects to an operator interface 130, an extra-vehicle communications system 110 and a GPS/navigation system 115 preferably via a high-speed communications bus 155. The aforementioned control module 10 associated with the engine 240 is preferably integrated into the control module 120 for coordinated control and operation of the vehicle 8. The extra-vehicle communications system 110 preferably includes short-range communications systems for vehicle-to-vehicle communications and global communications, e.g., satellite-based communications systems. The GPS/navigation system 115 includes a 3-D GIS (Geographic Information System) digital map system. The operator interface 130 includes a plurality of human/machine interface devices through which the vehicle operator commands operation of the vehicle 8, including an accelerator pedal, a brake pedal, and a transmission range selector. The operator interface 130 further includes an audio/visual interface to the GPS/navigation system 115 for on-board navigation, preferably including a visual display for trip planning/navigational mapping and route monitoring. The operator interface 130 preferably includes a manually operable trigger to permit a vehicle operator to have input into a regeneration event for the particulate filter 50, including triggering a regeneration event and delaying a regeneration event. The manually operable trigger includes three operator-selectable options in one embodiment, including triggering a regeneration event (YES), delaying a regeneration event (NO), and permitting the control system 120 to control timing of a regeneration event (AUTO).

The vehicle operator communicates an output torque command including an operator torque request, a direction of vehicle travel, i.e., forward or reverse, and a preferred range state for the transmission 250 through the accelerator pedal, the brake pedal, and the transmission range selector.

Figure 3:
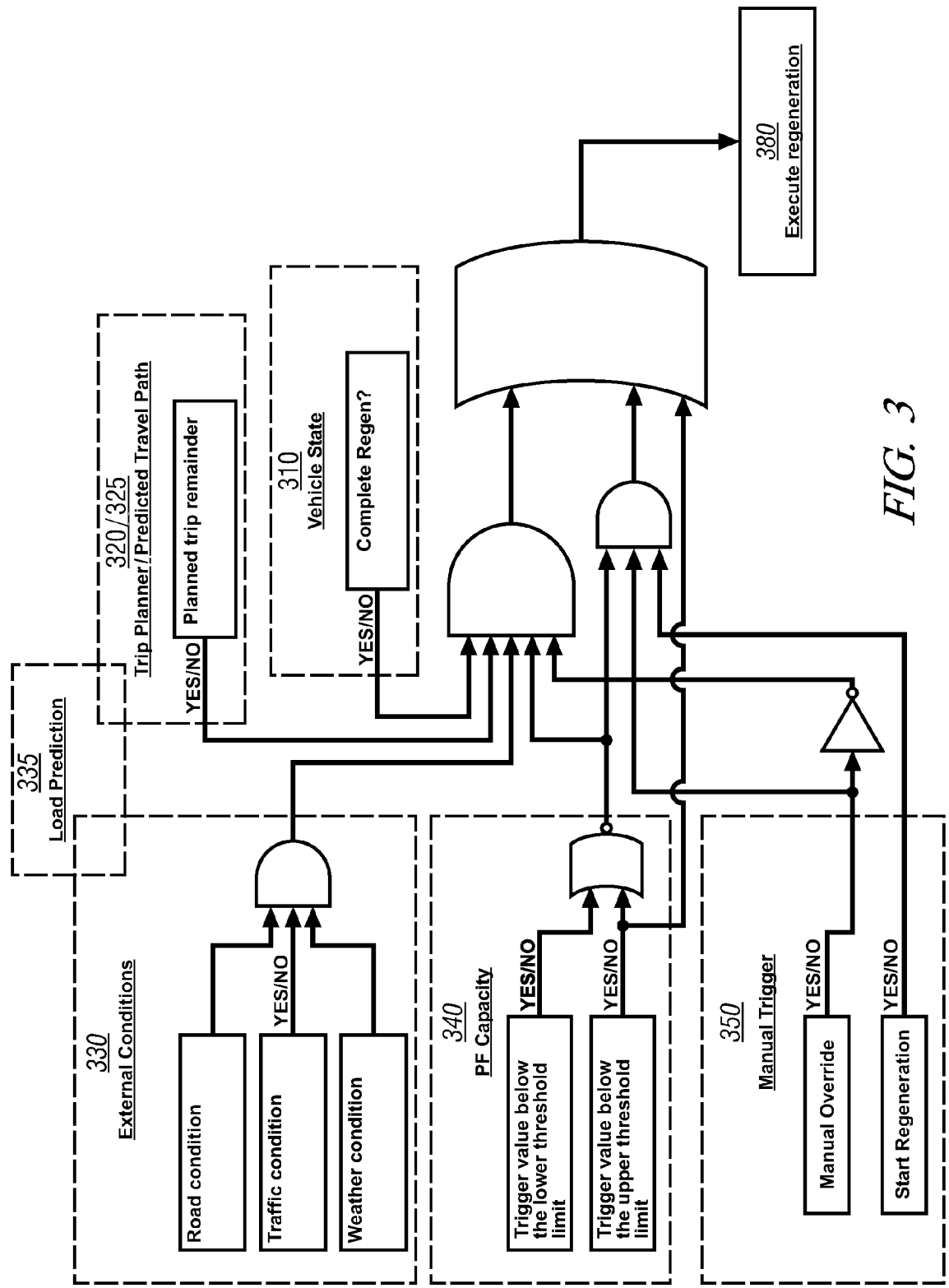
FIG. 3 is a schematic diagram of a logic flowchart in accordance with the present disclosure.

FIG. 3 shows a method in the form of a logic flowchart and a plurality of control schemes to decide whether to execute or delay execution of a particulate filter regeneration control scheme (Execute Regeneration) 380 to regenerate the particulate filter 50 for the exemplary vehicle system described herein with reference to FIGS. 1 and 2. In one embodiment, the logic flowchart includes known logic gates or operators including AND, OR, NOR and NOT gates. Each of a plurality of control schemes including a vehicle monitoring control scheme 310, a trip planning control scheme 320, a trip monitoring control scheme 325, an external conditions monitoring control scheme 330, a particulate filter monitoring control scheme 340, and a manual trigger control scheme 350 generates one or more logical outputs (YES/NO). The logical outputs are combined using the logic gates to decide whether to execute the particulate filter regeneration control scheme 380. This manner of presenting the decision-making process is shown for ease of explanation only. The logic flowchart of FIG. 3 is depicted as including discrete elements referred to as control schemes for ease of description. It should be recognized that the functions performed by these elements may be combined in one or more devices, e.g., implemented in software, hardware, and/or application-specific integrated circuitry, including one or more algorithms executed in the control module 120.

The vehicle monitoring control scheme 310 monitors present operations of the engine 240 and the vehicle 8 to determine relevant operating states.

The trip planning control scheme 320 can be executed to plan and monitor a trip of the vehicle 8 from a present location to a specific location using the on-board GPS/navigation system 115 and operator input from the operator interface 130 to the GPS/navigation system 115 for on-board navigation, preferably including a visual display for trip planning/navigational mapping and route monitoring. This includes determining a remaining portion of a planned trip from the present position. The trip planning control scheme 320 can project a mass of particulate matter that may be generated during the remaining portion of the planned trip.

The trip monitoring control scheme 325 determines a predicted travel path, including determining any remaining portion of an associated planned trip as described hereinabove where applicable.

The external conditions monitoring control scheme 330 monitors external local conditions in the form of road conditions, traffic conditions, and weather conditions can be monitored and associated vehicle operating conditions for the predicted travel path can be projected based upon information available using the on-board navigation and communications system.

The particulate filter monitoring control scheme 340 monitors a storage capacity of the particulate filter 50 to filter and store particulates in the exhaust gas feedstream.

The vehicle monitoring control scheme 310 monitors states of the vehicle 8 to determine whether the vehicle 8 has the capacity to execute the particulate filter regeneration control scheme 380 to completely regenerate the particulate filter 50. Examples of monitored vehicle states include vehicle load and kinematic operating states, remaining amount of fuel, and a state of health of the vehicle 8. The state of health of the vehicle 8 can include, e.g., tire pressure and absence/presence of engine or powertrain fault codes. A decision can be made (YES/NO) that indicates the capacity of the vehicle 8 to execute the particulate filter regeneration control scheme 380. For example, so long as the vehicle 8 has sufficient amount of fuel, the vehicle load and kinematic operating states indicate that the vehicle 8 is not operating in a high-speed, high-load operating condition, tire pressure is adequate, and there are no relevant engine or powertrain fault codes, the vehicle 8 has a capacity to execute the particulate filter regeneration control scheme 380.

The trip planning control scheme 320 plans and monitors a trip of the vehicle 8 from a present location to a specific location using the on-board GPS/navigation system 115. The trip monitoring control scheme 325 determines the predicted travel path, including any remaining portion of an associated planned trip. The on-board GPS/navigation system 115 is used to plan and monitor execution of a trip of the vehicle 8 to a specific location using on-board systems and off-board systems communicated via the communications system 110. This includes predicting a travel path for the vehicle 8, including determining any remaining portion of an associated planned trip.

The external conditions monitoring control scheme 330 monitors external local conditions in the form of road conditions, traffic conditions, and weather conditions, and associated vehicle operating conditions for a predicted travel path that is projected based upon information available using the on-board navigation and communications system. External local conditions include presence and location of entrance and exit ramps and intersections, road topology, speed limits, magnitude of traffic congestion, weather conditions and other factors related to the predicted travel path that is used to project vehicle speed and associated engine operation for a period of time into the future associated with the predicted travel path.

The monitored signal inputs originate from on-vehicle monitoring systems of the powertrain system 200 and extra-vehicle communications from the extra-vehicle communications system 110 and the GPS/navigation system 115. The on-vehicle monitoring systems include inputs from GPS devices, inertia measurement sensors, and infrared sensors and radar devices to estimate the traffic information of a defined active window in the vicinity of the vehicle 8. Other inputs include vehicle elevation and topographical information that can be determined by interpolating the on-board 3-D GIS digital map with GPS signal inputs and the predicted vehicle speed to generate a navigational trajectory. The GPS system interpolates information in the 3D GIS digital map to provide elevation information for a predicted travel path for the vehicle 8. Other information available from extra-vehicle communications can include a present geographic location of the vehicle 8, present traffic patterns in the vicinity of the geographic location of the vehicle 8, a present route of the vehicle 8, i.e., the direction the vehicle 8 is traveling on a specific roadway on its present travel path. The geographic information for the present route is evaluated to determine road load effects associated with topographical changes in elevation, curves, intersections, and other roadway features.

The external conditions monitoring control scheme 330 preferably includes a load prediction control scheme 335 to iteratively and periodically predict a vehicle load associated with the vehicle 8, taking into account information determined in the trip planning control scheme 320 and the trip monitoring control scheme 325. The road conditions, traffic conditions, and weather conditions are based upon operator driving behaviors, vehicle elevation and topographical information, and traffic patterns for the predicted travel path determined using the trip monitoring control scheme 325. The predicted vehicle load preferably takes the form of a predicted output power request and a predicted vehicle speed that can be translated to engine speed and load operating conditions. The vehicle load is predicted based upon the received inputs. In one embodiment, the external local conditions are segmented into road conditions, traffic conditions, and weather conditions, with associated decisions (YES/NO) indicating that each of the road conditions, traffic conditions, and weather conditions are conducive to vehicle operation that supports operating the engine 240 at speed and load conditions to achieve an exhaust gas feedstream flowrate and temperature that facilitate regeneration of the particulate filter 50 which are associated with executing the particulate filter regeneration control scheme 380.

The particulate filter monitoring control scheme 340 monitors the storage capacity of the particulate filter 50 and generates signal outputs associated with a lower threshold storage capacity trigger and an upper threshold storage capacity trigger. The storage capacity of the particulate filter 50 and thus an associated capacity to filter particulate matter from the exhaust gas feedstream are determined by ongoingly monitoring signal outputs of the first and second sensors 42 and 44. In one embodiment, this can include monitoring operation of the engine 240 and estimating a mass of particulate matter that has been generated by the engine 240 subsequent to a previous regeneration event. In one embodiment, this can include monitoring pressure in the exhaust gas feedstream upstream of the particulate filter 50 to detect when backpressure exceeds a threshold, indicating that the storage capacity of the particulate filter 50 is saturated.

The outputs of the particulate filter monitoring control scheme 340 include an indication (YES/NO) of whether the storage capacity of the particulate filter 50 has exceeded the lower threshold storage capacity. When the indication is that the lower threshold storage capacity has not been exceeded, the control scheme decides not to execute the particulate filter regeneration control scheme 380 regardless of the other conditions. Outputs include an indication (YES/NO) of whether the storage capacity of the particulate filter 50 has exceeded the upper threshold storage capacity. When the indication is that the upper threshold storage capacity has been exceeded, the control scheme decides to execute the particulate filter regeneration control scheme 380 regardless of the other conditions. When there are indications that the storage capacity of the particulate filter 50 has exceeded the lower threshold storage capacity and is less than the upper threshold storage capacity, then the control scheme can decide to execute the particulate filter regeneration control scheme 380 based upon the other conditions.

The manual trigger control scheme 350 is used to execute and delay execution of the particulate filter regeneration control scheme 380. The manual trigger control scheme 350 includes input from a manually operable trigger available to the vehicle operator at the operator interface 130, and preferably includes three operator-selectable options, including triggering a regeneration event, delaying a regeneration event, and permitting the control system 120 to control execution of the particulate filter regeneration control scheme 380. As depicted, execution of the particulate filter regeneration control scheme 380 can be triggered by an operator input, e.g., Start Regeneration=YES. Execution of the particulate filter regeneration control scheme 380 can be delayed by an operator input, e.g., Manual Override=YES. These inputs are preferably mutually exclusive. When there is no operator input, e.g., Start Regeneration=NO and Manual Override=NO, the control system 120 decides when to execute the particulate filter regeneration control scheme 380. Other factors affect actual execution of the particulate filter regeneration control scheme 380, as indicated by the logic flowchart.

The particulate filter regeneration control scheme 380 for regenerating the particulate filter 50 includes periodically executing a control scheme to control operation of the engine 240 to regenerate the particulate filter 50 in one embodiment. The control scheme to control operation of the engine 240 includes commanding engine operation to a speed/load operating point and an air/fuel ratio to achieve exhaust gas temperatures in excess of 600° C. in the particulate filter 50. In one embodiment, when the engine 240 is commanded to operate at a speed/load operating point and air/fuel ratio to achieve exhaust gas temperatures in excess of 600° C. in the particulate filter 50, mechanical power from the engine 240 can be transferred to the transmission 250 and the driveline 280 via the output member 64 as tractive torque that is responsive to the output torque command including the operator torque request. Mechanical power from the engine 240 in excess of the output torque command including the operator torque request can be transferred to one of the torque machine(s) 230 to generate energy that can be stored in the ESD 210. Alternatively, when the mechanical power from the engine 240 is less than the output torque command including the operator torque request, power stored in the ESD 210 can be transferred to one of the torque machine(s) 230 to generate mechanical power that is transferred to the transmission 250 to the driveline 280 as tractive torque.

Execution of the particulate filter regeneration control scheme 380 can be manually triggered, i.e., an operator can request that the particulate filter 50 be regenerated by way of the manual trigger control scheme 350. The particulate filter regeneration control scheme 380 executes unless the particulate filter monitoring control scheme 340 indicates that the storage capacity of the particulate filter 50 is less than the lower threshold storage capacity trigger, among other conditions associated therewith. The associated conditions include projected vehicle operating conditions associated with the predicted travel path and the present operations of the engine 240 and the vehicle 8 as determined by the vehicle monitoring control scheme 310.

Execution of the particulate filter regeneration control scheme 380 may be manually delayed, i.e., an operator can request that any execution of the particulate filter regeneration control scheme 380 be delayed for a period of time. The control scheme will delay such execution unless the particulate filter monitoring control scheme 340 indicates that the storage capacity of the particulate filter 50 exceeds the upper threshold storage capacity trigger.

The particulate filter regeneration control scheme 380 is executed when the particulate filter monitoring control scheme 340 indicates that the storage capacity of the particulate filter 50 exceeds the upper threshold storage capacity trigger. Under such conditions, the particulate filter regeneration control scheme 380 is executed regardless of inputs from the other control schemes.

Execution of the particulate filter regeneration control scheme 380 is delayed when the particulate filter monitoring control scheme 340 indicates that storage capacity of the particulate filter 50 is less than the lower threshold storage capacity trigger, regardless of inputs from the other control schemes.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for regenerating a particulate filter configured to treat engine exhaust gas in a vehicle equipped with an on-board navigation and an extra-vehicle communications system, comprising:
   monitoring present operations of the engine and the vehicle;
   projecting vehicle operating conditions based upon information from the on-board navigation and the extra-vehicle communications system;
   monitoring a storage capacity of the particulate filter;
   executing an engine control scheme to regenerate the particulate filter when the storage capacity of the particulate filter exceeds an upper threshold;
   executing the engine control scheme to regenerate the particulate filter when the storage capacity of the particulate filter is less than the upper threshold and in response to an operator request to regenerate the particulate filter;
   delaying executing the engine control scheme to regenerate the particulate filter in response to a second operator request when the storage capacity of the particulate filter is less than the upper threshold;
   executing the engine control scheme to regenerate the particulate filter when the storage capacity of the particulate filter is less than the upper threshold and the projected vehicle operating conditions indicate an opportunity to regenerate the particulate filter; and delaying executing the engine control scheme to regenerate the particulate filter when the storage capacity of the particulate filter is less than a lower threshold.

2. The method of claim 1, further comprising executing the engine control scheme to regenerate the particulate filter only when the storage capacity of the particulate filter is greater than the lower threshold.

3. The method of claim 1, wherein projecting vehicle operating conditions based upon information from the on-board navigation and the extra-vehicle communications system further comprises:
   predicting a travel path;
   monitoring road conditions, traffic conditions, and weather conditions for the predicted travel path; and
   projecting a vehicle load for the predicted travel path associated with the road conditions, traffic conditions, and weather conditions.

4. The method of claim 1, wherein executing the engine control scheme to regenerate the particulate filter includes commanding operation of the engine to an operating point and an air/fuel ratio to achieve a temperature in excess of 600° C. in the particulate filter.

5. The method of claim 4 wherein the vehicle is further equipped with a hybrid powertrain system including a hybrid transmission coupled to the internal combustion engine, the method further comprising:
   determining an operator torque request;
   transferring mechanical power generated by the engine in excess of the operator torque request to a torque machine associated with the hybrid transmission during the commanded operation of the engine to the operating point and the air/fuel ratio to achieve a temperature in excess of 600° C. in the particulate filter.

6. A method for regenerating a particulate filter configured to treat engine exhaust gas in a vehicle equipped with an on-board navigation and an extra-vehicle communications system, comprising:
   projecting vehicle operating conditions based upon information available using the on-board navigation and the extra-vehicle communications system;
   monitoring present operation of the vehicle and a storage capacity of the particulate filter;
   regenerating the particulate filter in response to an operator request to regenerate the particulate filter;
   regenerating the particulate filter when the projected vehicle operating conditions indicate a forthcoming opportunity to regenerate the particulate filter;
   delaying regenerating the particulate filter when the storage capacity of the particulate filter is less than a lower threshold; and
   delaying executing a control scheme to regenerate the particulate filter in response to a second operator request when the storage capacity of the particulate filter is less than an upper threshold.

7. The method of claim 6, wherein regenerating the particulate filter when the projected vehicle operating conditions indicate a forthcoming opportunity to regenerate the particulate filter further comprises regenerating the particulate filter only when the storage capacity of the particulate filter is less than the upper threshold.

* * * * *